(12) United States Patent
Brabson et al.

(10) Patent No.: US 7,984,479 B2
(45) Date of Patent: Jul. 19, 2011

(54) POLICY-BASED SECURITY CERTIFICATE FILTERING

(75) Inventors: Roy F. Brabson, Raleigh, NC (US);
Barry Mosakowski, Raleigh, NC (US);
Linwood H. Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 11/405,069

(22) Filed: Apr. 17, 2006

(65) Prior Publication Data

US 2007/0245401 A1 Oct. 18, 2007

(51) Int. Cl.
*G06F 17/00* (2006.01)
*H04L 29/06* (2006.01)
*H04L 9/32* (2006.01)

(52) U.S. Cl. ............. 726/1; 726/10; 713/155; 713/156; 713/157; 713/158

(58) Field of Classification Search .......... 713/155–157; 726/10
See application file for complete search history.

(56) References Cited

U.S. PATENT DOCUMENTS

| | | | | |
|---|---|---|---|---|
| 6,353,886 B1 * | 3/2002 | Howard et al. | ............... | 713/156 |
| 2002/0010785 A1 | 1/2002 | Katsukawa et al. | | |
| 2002/0069200 A1 * | 6/2002 | Cooper et al. | ................. | 707/9 |
| 2002/0144110 A1 * | 10/2002 | Ramanathan | ................ | 713/156 |
| 2003/0097592 A1 | 5/2003 | Adusumilli | | |
| 2003/0110374 A1 | 6/2003 | Yamamoto et al. | | |
| 2004/0049687 A1 * | 3/2004 | Orsini et al. | ................. | 713/189 |
| 2004/0243805 A1 | 12/2004 | Enokida | | |
| 2004/0268148 A1 | 12/2004 | Karjala et al. | | |
| 2005/0033957 A1 | 2/2005 | Enokida | | |
| 2005/0091484 A1 * | 4/2005 | Thornton et al. | ............. | 713/156 |
| 2005/0138351 A1 | 6/2005 | Lee et al. | | |
| 2005/0257058 A1 | 11/2005 | Yoshida et al. | | |
| 2007/0118874 A1 * | 5/2007 | Adams et al. | ..................... | 726/1 |

(Continued)

FOREIGN PATENT DOCUMENTS

WO    WO 03/026200 A    3/2003

OTHER PUBLICATIONS

Automatic updating of trusted root authorities , Jan. 21, 2005, p. 1, Publisher: Microsoft Corporation. <http://technet2.microsoft.com/WindowsServer/en/Library/e539554e-d478-4b8b-9fa4-cd12c476c98f1033.mspx>.Printed on Apr. 6, 2006.

(Continued)

*Primary Examiner* — Taghi T Arani
*Assistant Examiner* — Thaddeus Plecha
(74) *Attorney, Agent, or Firm* — Marcia L. Doubet

(57) ABSTRACT

Policy filtering services are built into security processing of an execution environment for resolving how to handle a digital security certificate of a communicating entity without requiring a local copy of a root certificate that is associated with the entity through a certificate authority ("CA") chain. Policy may be specified using a set of rules (or other policy format) indicating conditions for certificate filtering. This filtering is preferably invoked during handshaking, upon determining that a needed root CA certificate is not available. In one approach, the policy uses rules specifying conditions under which a certificate is permitted (i.e., treated as if it is validated) and other rules specifying conditions under which a certificate is blocked (i.e., treated as if it is invalid). Preferably, policy rules are evaluated and enforced in order of most-specific to least-specific.

16 Claims, 4 Drawing Sheets

U.S. PATENT DOCUMENTS

2010/0083347 A1* 4/2010 Hinton .............................. 726/1

OTHER PUBLICATIONS

Certificate autoenrollment, Jan. 21, 2005, p. 1, Publisher: Microsoft Corporation <http://technet2.microsoft.com/WindowsServer/en/Library/34d3ea27-8cef-4db8-a008-7b1e5f2df3ac1033.mspx>. Printed on Apr. 6, 2006.

Certificates and Authentication, Jan. 21, 2005, p. 1, Publisher: Microsoft Corporation <http://technet2.microsoft.com/WindowsServer/en/Library/25f7ac34-6045-4c3c-b7f3-bf78d6207f71l033.mspx>. Printed on Apr. 6, 2006.

Certificate Services example implementation: Establishing autoenrollment for user certificates, Jan. 21, 2005, p. 3, Publisher: Microsoft Corporation <http://technet2.microsoft.com/WindowsServer/en/Library/e69746a2-81d9-43d0-9d82-93b5760bea361033.mspx>. Printed on Apr. 6, 2006.

Certificate stores, Jan. 21, 2005, p. 3, Publisher: Microsoft Corporation <http://technet2.microsoft.com/WindowsServer/en/Library/1c4d3c02-e996-450a-bf4f-9a12d245a7eb1033.mspx>. Printed on Apr. 6, 2006.

Managing trust of third-party certification authorities, Jan. 21, 2005, p. 1, Publisher: Microsoft Corporation <http://technet2.microsoft.com/WindowsServer/en/Library/93a36907-dcf1-4012-afdf-5c64ab840cff1033.mspx>. Printed on Apr. 6, 2006.

Managing trust of user-selected certification authorities, Jan. 21, 2005, p. 1, Publisher: Microsoft Corporation. <http://technet2.microsoft.com/WindowsServer/en/Library/9839177b-7d23-459f-b7f8-62a78c9846bc1033.mspx>.Printed on Apr. 6, 2006.

* cited by examiner

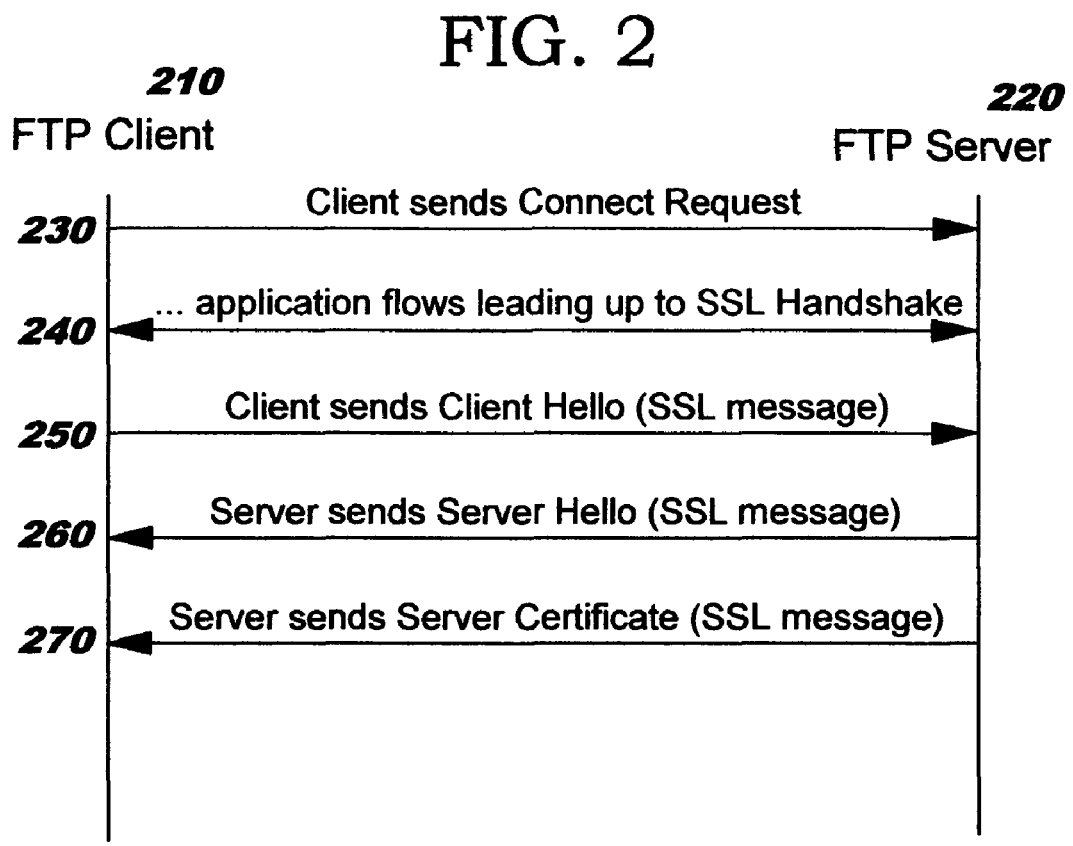

POLICY-BASED SECURITY CERTIFICATE FILTERING

BACKGROUND OF THE INVENTION

The present invention relates to computer security, and deals more particularly with secure communications exchange over a communications network.

Transport Layer Security ("TLS") and Secure Sockets Layer ("SSL") are commonly-used security tools for incorporating authentication and encryption within client/server networks. TLS and SSL are networking protocols designed to be used in the Internet environment, which was not originally designed as a secure environment, and operate as a protocol layer above the TCP/IP ("Transmission Control Protocol"/ "Internet Protocol") layers. Application code then resides above TLS/SSL in the networking protocol stack. After an application (such as a browser) creates data to be sent to another entity in the network, the data is passed from the application layer to the TLS/SSL layer, where various security procedures are performed on it, and the TTS/SSL layer then passes the transformed data on to the TCP layer. On the receiver's side of the connection, after the TCP layer receives incoming data, it passes that data upward to the TLS/SSL layer, where procedures are performed to restore the data to its original form, and that restored data is then passed to the receiving application.

BRIEF SUMMARY OF THE INVENTION

The present invention defines techniques for policy-based filtering of security certificates. In one aspect, the present invention preferably comprises steps of: receiving, by a first entity in a communications network, a security certificate of a second entity; and determining whether the first entity will treat the security certificate as though it has been authenticated. The determining step preferably comprises steps of: locating at least one policy specification that is applicable to resolving the determination; and evaluating each of the at least one located policy specifications until reaching a conclusion about how to treat the security certificate.

The locating step preferably further comprises locating at least one policy specification that pertains to this security certificate, and this policy specification may pertain (for example) to the first entity and/or the second entity.

The conclusion preferably indicates that the first entity will treat the security certificate as though it has been authenticated or has been authenticated. Embodiments may also support a conclusion indicating that input from a user is required to determine how the first entity will treat the security certificate, and in this case, the user input is preferably requested and used.

The first and second entities may be a client device and a server device, or vice versa. The receiving and determining steps may occur during a protocol handshaking flow between the first entity and the second entity. The determining step preferably occurs responsive to determining that a certificate authority certificate needed for authenticating the security certificate is not available at the first entity receiving a certificate.

The policy specifications are preferably evaluated in order of most-specific to least-specific. The conclusion about how the first entity will treat the security certificate may be reached after evaluating a first matching one of the located policy specifications; in other cases, the conclusion may be reached after evaluating at least two matching ones of the located policy specifications. The policy specifications may comprise policy rules, each policy rule comprising at least one condition to be used in the evaluation and an action to be used in reaching the conclusion.

A conclusion that the first entity will treat the security certificate as though it has been authenticated may be reached upon evaluating at least one matching one of the located policy specifications that specifies conditions under which the security certificate is permitted. A conclusion that the first entity will treat the security certificate as though it has not been authenticated may be reached upon evaluating at least one matching one of the located policy specifications that specifies conditions under which the security certificate is blocked.

The evaluation preferably further comprises comparing each of at least one condition specified in the evaluated policy specifications to information pertaining to the security certificate. The information pertaining to the security certificate may comprise (by way of example) an issuer thereof and/or a validity period thereof.

The policy specifications that are applicable to determining how the first entity will treat the security certificate may comprise policy specifications pertaining to at least one value specified in the security certificate, to the first entity, and/or to the second entity.

The method may further comprise enforcing the conclusion about how the first entity will treat the security certificate.

Embodiments of the present invention may also, or alternatively, be provided as systems or computer program products.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 2 depicts message flows in a scenario in which a client authenticates a server;

FIG. 3 illustrates sample policy specified as rules, according to one or more embodiments of the present invention;

DETAILED DESCRIPTION OF THE INVENTION

By default, TLS and SSL assume a server-authentication mode where the server sends its signed digital certificate to the client during a handshaking phase of the protocol. Certificates are issued through a trusted certificate authority ("CA"), and the CA issuing a particular certificate is responsible for digitally signing the certificate so that the authenticity of the certificate can be established by authenticating (i.e., validating) the CA's digital signature thereupon. Thus, when a client receives a server's signed digital certificate, the client is responsible for authenticating the server using the server's certificate and one or more other CA certificates that are associated with the server through a certificate authority chain. In some cases, the server may send additional certificates to the client along with its own. If so, the certificates are sent in an ordered "certificate list" where the server's certificate appears first and is followed by CA certificates that begin with the CA issuing the server's certificate and that proceed sequentially upward to a root CA.

The root certificates known to the client generally reside on what is commonly referred to as a "key ring". Most commonly-used digital certificates meet the standards and format specified in the X.509 specification for public key infrastructure ("PKI"), as described in Request for Comments ("RFC") 2459. Accordingly, these digital certificates are commonly referred to as "X.509 digital certificates" or "X.509 certificates". (RFC 2459 is published by the Internet Engineering Task Force, or "IETF".)

Figure 1:
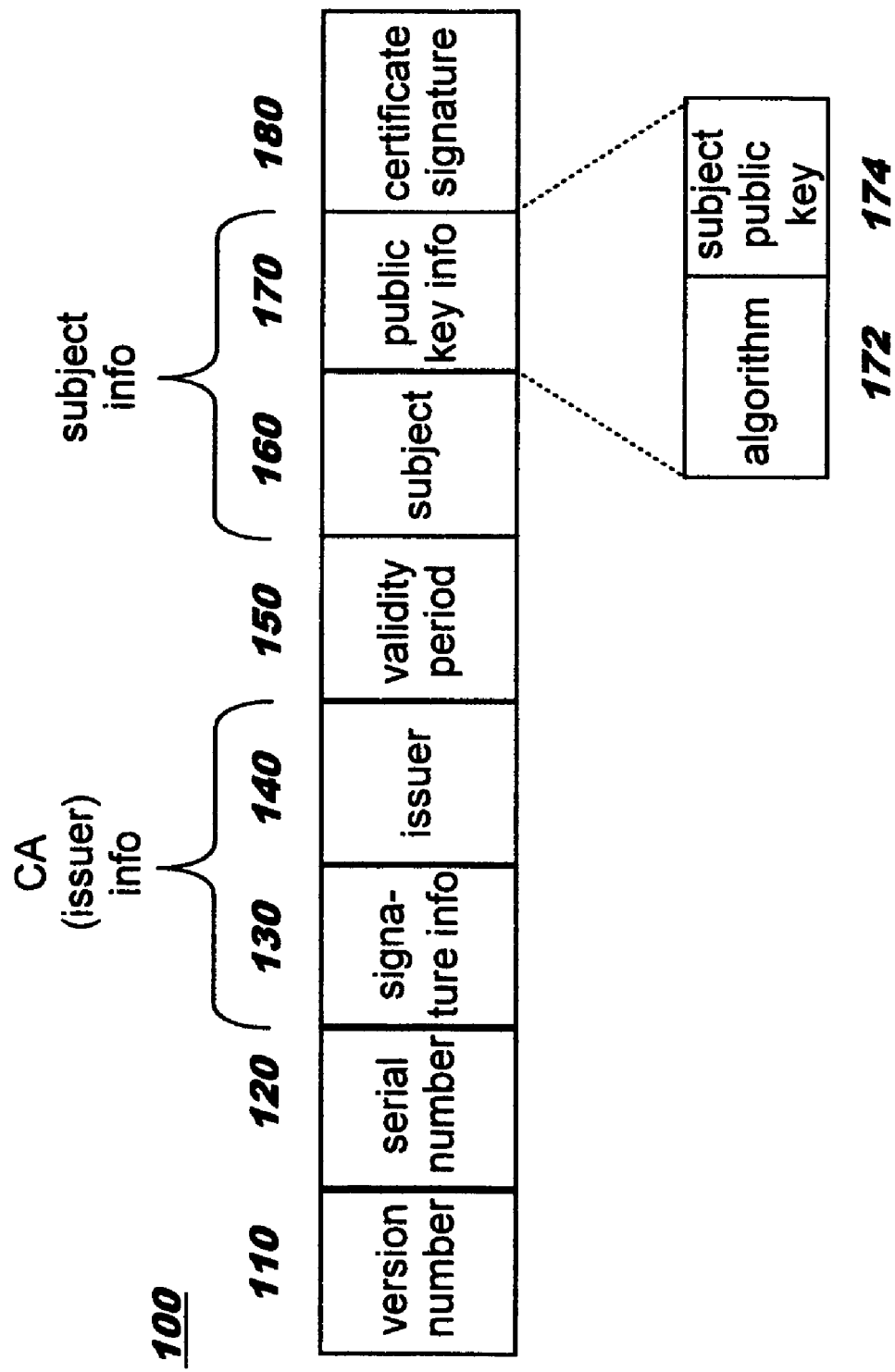
FIG. 1 illustrates a representative format of a digital certificate that may be used with embodiments of the present invention.

A digital signature on a digital certificate is created by computing a hashed digest of the certificate, including its public key field. See FIG. 1 for a representative format 100 of an X.509 digital certificate. (The X.509 digital certificate format is a binary-based format and can be interpreted with reference to the certificate structure defined in RFC 2459.) Values in fields 110 through 170 are used when computing the hashed digest.

Representative content of these fields of digital certificate 100 will now be briefly described in more detail. Version number field 110 specifies the version of the certificate (and may be omitted when a default value is applicable). Serial number field 120 is a unique integer value assigned by the CA to each certificate it issues (and the serial number field 120 and issuer field 140 therefore identify a unique certificate). The signature information field 130 indicates which algorithm was used for creating the digital signature and specifies parameters used with that algorithm, and issuer field 140 identifies the CA that issued this certificate. Field 150 specifies a validity period of the certificate, indicating a time period during which the CA warrants that it will maintain information about the status of the certificate. This field 150 typically comprises a "notBefore" date and a "notAfter" date, where the "notbefore" date is the date on which the certificate validity period begins and the "notAfter" date is the date on which the certificate validity period ends. Subject field 160 identifies the server (or, more generally, the entity or "subject") for which the certificate was created. Algorithm field 172 identifies an algorithm with which the public key stored in subject public key field 174 is used. Thus, when the certificate is issued for a server, field 174 stores the server's public key.

The hashed digest computed over fields 110-170 is encrypted using the signing (i.e., issuing) CA's private key, thereby creating the digital signature value 180. (The size of the hashed number used for creating the certificate's digital signature 180 may vary, depending on the signing algorithm identified in field 130.)

When the certificate 100 is being validated, the public key of the signing CA is used by the validator to decrypt the certificate's digital signature field 180. The validator will then re-compute the hash over fields 110-170 and compare it to the decrypted value of field 180. If these values match, then the certificate is authenticated and can be trusted. During the TTS/SSL handshake, this validation process is to be performed for each certificate in the chain to the root CA.

When using SSLUTLS for security and the server does not send a certificate list, it is common for a client to receive a server certificate for which the root certificate is not available on the client's key ring. Many execution platforms then present a message to the end user, requesting the end user to personally review the server certificate and either accept or decline this certificate. The end user's response determines whether or not the TLS/SSL handshake continues.

Several problems emanate from this approach. If the server requires a secure connection, the client device needs to have on its key ring the root certificate for every server certificate that may be received. This is an administrative burden for the client In addition, many end users lack the technical knowledge to perform an evaluation of a server certificate. Accordingly, many end users simply choose to accept the certificate without any review thereof. As a result, an end user may unwittingly accept a rogue server certificate, and this may present a security exposure. Furthermore, a fundamental design principle of TLS/SSL was to ensure the ability to provide both authentication and encryption over a client/server session. When the end user at the client arbitrarily accepts a server certificate, the aspect of authentication is lost. The session may still be encrypted, providing for confidentiality of data during transmission, but without proper authentication in place, the end user at the client cannot be sure of what entity he or she is communicating with at the server side.

According to preferred embodiments of the present invention, policy filtering services are built into security processing of an execution environment, enabling policy filtering to be provided through basic system calls. "Policy", as that term is used herein, indicates a condition that is the impetus for an action. Preferred embodiments specify policy through a set of rules (as will be described in more detail with reference to the example in FIG. 3) that are preferably created by security personnel (such as network administrators) who are responsible for security within a particular operating environment.

The policy filtering of preferred embodiments is designed to help reduce the need for storing a local copy of the root of every certificate, so that the client may avoid having every root certificate on its key ring, while providing a base level of certificate requirements and to reduce the likelihood of security intrusions. Preferred embodiments may also provide the ability for security personnel to have more control over what is going on in systems for which they are responsible.

Preferred embodiments are described herein with reference to use in an operating environment comprising the z/OS® operating system, the File Transfer Protocol ("FTP"), System SSL providing the TLS/SSL functionality, Resource Access Control Facility ("RACF"®) providing back-end security, and a Policy Agent ("PAgent") component for creating policy rules for server certificates. ("z/OS" and "RACF" are registered trademarks of International Business Machines Corporation in the United States, other countries, or both.) This operating environment is used by way of illustration and not of limitation.

Referring now to FIG. 2, the above-describe scenario is illustrated, leading up to the client's realization that the client does not have a needed root certificate on the client's key ring. By way of example, this illustration uses FTP message flows with the SSL protocol. As shown in FIG. 2, FIP client 210 sends a connect request 230 to an FTP server 220. Various application flows 240 may then be exchanged. SSL handshaking flows 250-270 are then exchanged, and comprise a client hello 250 and a server hello 260, after which the server sends its digitally-signed certificate at 270. (In this example, the server does not include other certificates in a certificate list.)

In this example scenario, FTP client 210 realizes, upon receiving the server certificate at 270, that the root CA certificate is not available on the client's key ring. As has been discussed, an end user is generally responsible for resolving this problem when using prior art techniques. According to preferred embodiments, however, policy rules are consulted to determine how to resolve the problem.

The policy agent or "PAgent" of preferred embodiments may be used by security personnel to establish policy rules to specify how unresolved incoming server certificates of the type illustrated in FIG. 2 will be handled, and the PAgent preferably stores the rules in a configuration file or other repository. (In an alternative embodiment, rules may be created and stored in other ways, such as by using a text editor. Furthermore, the present invention is not limited to rules created by security personnel. Alternatives include policy specified by end users and policy generated by programmatic techniques.)

Suppose that the policy rules currently availability in the scenario of FIG. 2 include rules 310, 320 as shown in FIG. 3. In this example, rule 310 is a "Permit" rule and specifies a set of conditions under which server certificates will be permitted (i.e., treated as if they have been validated) even though the root CA certificate is not available. Rule 320 is a "Block" rule that specifies conditions under which certificates will be blocked (i.e., treated as if they are invalid). In this example, rule 310 specifies that an unknown server certificate will be permitted if the certificate has a valid time period (that is, the current date/time is within the certificate's validity period field 150, where the current date/time is referred to in the rule as "ValidTimePeriod") and its issuer is "CompanyX". Example rule 320 specifies that all certificates are to be blocked.

In preferred embodiments, policy rules are evaluated and enforced in order of most-specific to least-specific. Thus, if the conditions in rule 310 are met, the server certificate is permitted (and rule 320 is preferably not evaluated). In some scenarios, as will be obvious from the teachings provided herein, multiple rules might be evaluated before encountering a matching rule (that is, a rule for which the specified conditions are met). Policy rules may be written such that more than one matching rule is evaluated to determine whether a particular server certificate is permitted or blocked, if desired, where each matching rule that is evaluated preferably operates to further filter the certificate.

According to preferred embodiments, evaluation of rules is performed at the PAgent component and policy enforcement is performed by a Policy Enforcement Point ("PEP") residing in the client which received the server certificate (although this placement of responsibility is by way of illustration and not of limitation).

If the PAgent finds a matching rule (or rules, as applicable) in the policy configuration file, it preferably makes a security authorization facility ("SAF") call to RACF with this information. Responsive to this call, the RACF component preferably updates its stored information to indicate that FTP client 210 is permitting the server certificate from FTP server 220 in spite of not having the root CA certificate available for validation.

In preferred embodiments, a component such as System SSL is leveraged for security processing such as providing data encryption and decryption, as well as performing authentication-related processing Concluding the policy filtering disclosed herein), through SAF calls to RACF. Accordingly, FTP client 210 preferably passes all TLS/SSL-based requests to System SSL for processing. Upon receiving the server certificate at 270 of FIG. 2, FTP client 210 preferably passes the server's certificate and the client's local key ring to System SSL. System SSL then attempts validation of the passed-in server certificate, as discussed earlier, by decrypting the issuer's digital signature, recomputing the hashed digest, and comparing those values. System SSL then reads the passed-in key ring information and performs this digital signature processing on each certificate in the root CA certificate chain. (In an alternative embodiment, the key ring may be made available to System SSL in another way, such as by storing key rings in RACF and providing these key rings to System SSL upon request.)

Upon determining that the key ring does not include all of the required certificates in the chain, System SSL calls RACF to view policy rules that are to be evaluated, according to preferred embodiments, as an alternative for validating this certificate. According to preferred embodiments, one or more fields from the server certificate are used for identifying the applicable rules; an identification of the client may be used in addition or instead. For example, a policy repository may contain rules that are logically (or physically) grouped according to the issuing CA. In other embodiments, all policy specifications may be evaluated until a conclusion is reached about whether this particular server certificate should be permitted or blocked.

RACF may make the rules available to System SSL in various ways, including through shared storage or by returning a set of rules as a parameter, without deviating from the scope of the present invention. (Furthermore, a SAF component such as RACF may perform the policy evaluation and return a pennit/block result to the invoking code, in one alternative embodiment.)

If System SSL determines that the conditions in an applicable "permit"-type policy rule (or rules, as applicable) are met, the server certificate is to be permitted; otherwise, in preferred embodiments, the server certificate is to be blocked. (And as illustrated by rule 320 in FIG. 3, a matching "block"-type rule may explicitly specify conditions under which the certificate is to be blocked.) System SSL preferably returns a permit/block return code to the invoking code, which in the scenario of FIG. 2 is a PEP at FTP client 210. If the return code is "permit", FTP client 210 continues with the FTP and SSL flows (which may comprise, among other things, authenticating the client); otherwise, the handshake fails.

Optionally, one or more embodiments of the present invention may allow the end user to specify whether the server certificate should be permitted. Preferably, this option is used where neither a matching "permit" rule or a matching "block" rule is found. For example, if rule 320 is not present in the rules repository and the conditions in rule 310 are not matched, the end user may be queried to determine how to proceed.

Techniques of the present invention are not limited to use with a client that desires to resolve a server certificate for which the root CA cannot be validated, and may alternatively (or additionally) be used by a server that is performing authentication of a client's digital certificate.

While a small number of policy rules is illustrated in FIG. 3, it will be obvious to one of skill in the art, given the teachings provided herein, that a policy repository may contain a large number of policy rules. And, although the sample rules 310, 320 are relatively simple and use a "permit" and "block" syntax, this is by way of illustration only: rules used in an actual implementation may vary in complexity and alternative syntax may be used. Furthermore, embodiments of the present invention are not limited to policy specified as rules: other formats may be used without deviating from the scope of the present invention.

Alternative components may be substituted for those described herein without deviating from the scope of the present invention. Alternative components for SAF functionality include CA-ACF2® from Computer Associates. ("CA-ACF2" is a registered trademark of Computer Associates International, Inc. in the United States, other countries, or both.) Alternatives for the PAgent functionality include any policy-based logic implementation. Alternatives for PEP include any functionality adapted to permit or block communication after resolving how to handle a server certificate for which the root CA cannot be validated. Alternatives for System SSL include other mechanisms for providing authentication-related processing (and, optionally encryption and/or decryption). Alternatives to a key ring include other types of key management data structures.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device. The computer-usable or computer-readable medium is not a signal.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 4:
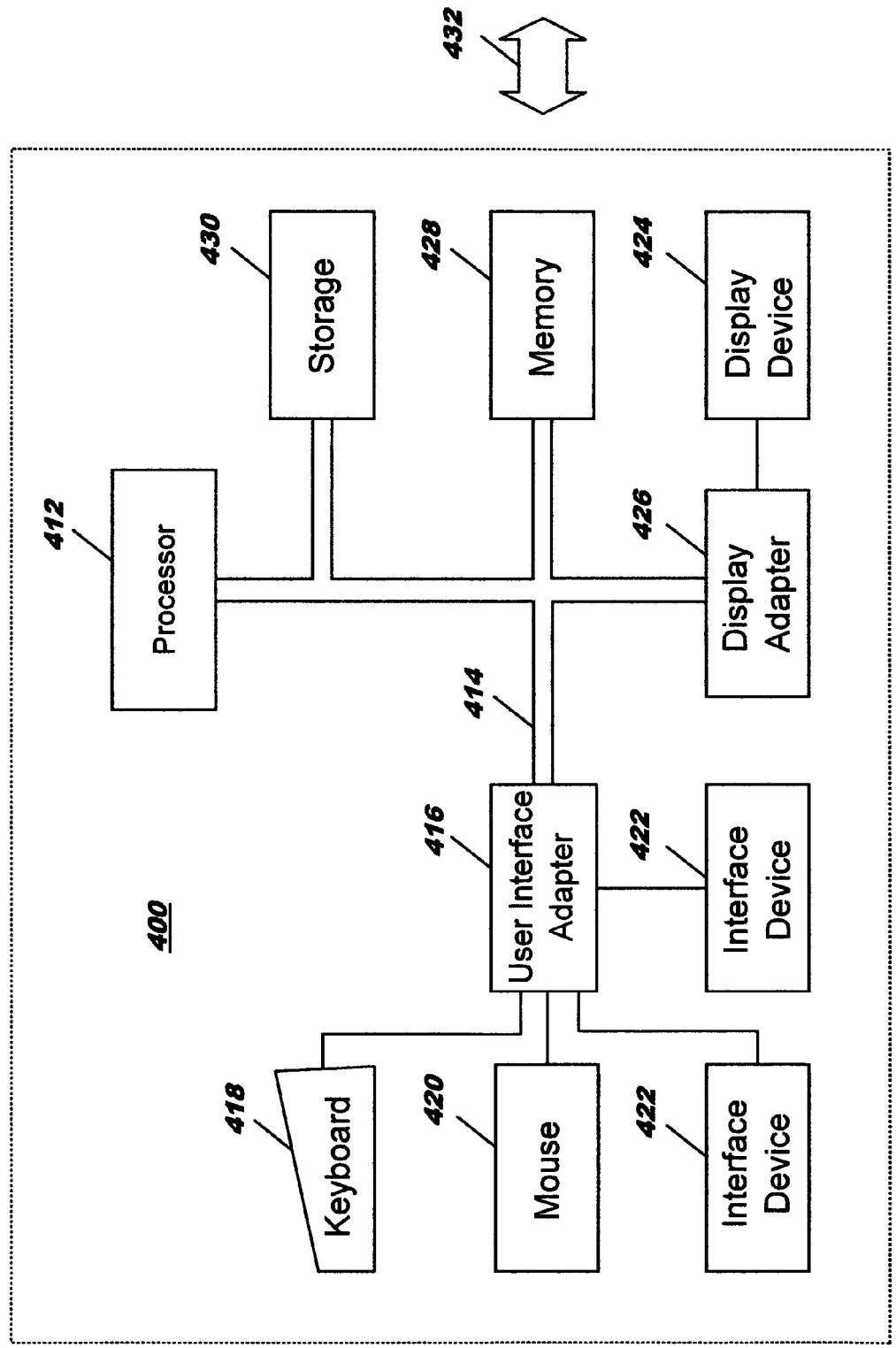
FIG. 4 depicts a data processing system suitable for storing and/or executing program code.

Referring now to FIG. 4, a data processing system 400 suitable for storing and/or executing program code includes at least one processor 412 coupled directly or indirectly to memory elements through a system bus 414. The memory elements can include local memory 428 employed during actual execution of the program code, bulk storage 430, and cache memories (not shown) which provide temporary storage of at least some program code in order to reduce the number of times code must be retrieved from bulk storage during execution.

Input/output ("I/O") devices (including but not limited to keyboards 418, displays 424, pointing devices 420, other interface devices 422, etc.) can be coupled to the system either directly or through intervening I/O controllers or adapters (416, 426).

Network adapters may also be coupled to the system to enable the data processing system to become coupled to other data processing systems or remote printers or storage devices through intervening private or public networks (as shown generally at 432). Modems, cable modem attachments, wireless adapters, and Ethernet cards are just a few of the currently-available types of network adapters.

Figure 5:
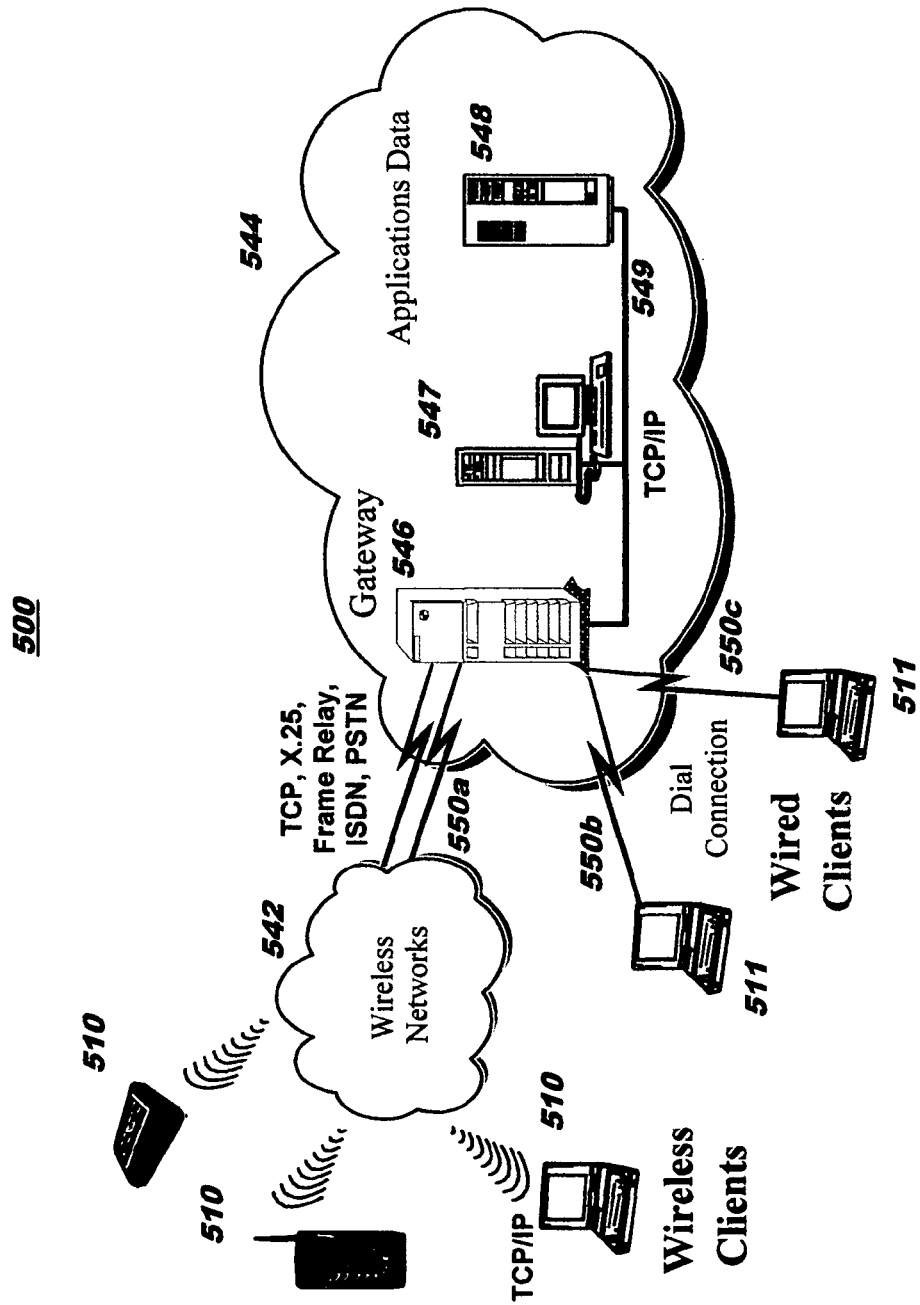
FIG. 5 depicts a representative networking environment in which one or more embodiments of the present invention may be used.

FIG. 5 illustrates a data processing network environment 500 in which the present invention may be practiced. The data processing network 500 may include a plurality of individual networks, such as wireless network 542 and network 544. A plurality of wireless devices 510 may communicate over wireless network 542, and a plurality of wired devices, shown in the figure (by way of illustration) as workstations 511, may communicate over network 544. Additionally, as those skilled in the art will appreciate, one or more local area networks ("LANs") may be included (not shown), where a LAN may comprise a plurality of devices coupled to a host processor.

Still referring to FIG. 5, the networks 542 and 544 may also include mainframe computers or servers, such as a gateway computer 546 or application server 547 (which may access a data repository 548). A gateway computer 546 serves as a point of entry into each network, such as network 544. The gateway 546 may be preferably coupled to another network 542 by means of a communications link 550a. The gateway 546 may also be directly coupled to one or more workstations 511 using a communications link 550b, 550c, and/or may be indirectly coupled to such devices. The gateway computer 546 may be implemented utilizing an Enterprise Systems Architecture/370™ available from IBM, an Enterprise Systems Architecture/390® computer, etc. Depending on the application, a midrange computer, such as an Application System/400® (also known as an AS/400®) may be employed. ("Enterprise Systems Architecture/370" is a trademark of IBM; "Enterprise Systems Architecture/390", "Application System/400", and "AS/400" are registered trademarks of IBM in the United States, other countries, or both.)

The gateway computer 546 may also be coupled 549 to a storage device (such as data repository 548).

Those skilled in the art will appreciate that the gateway computer 546 may be located a great geographic distance from the network 542, and similarly, the wireless devices 510 and/or workstations 511 may be located some distance from the networks 542 and 544, respectively. For example, the network 542 may be located in California, while the gateway 546 may be located in Texas, and one or more of the workstations 511 may be located in Florida. The wireless devices 510 may connect to the wireless network 542 using a networking protocol such as the Transmission Control Protocol/Internet Protocol ("TCP/IP") over a number of alternative connection media, such as cellular phone, radio frequency networks, satellite networks, etc. The wireless network 542 preferably connects to the gateway 546 using a network connection 550a such as TCP or User Datagram Protocol ("UDP") over IP, X.25, Frame Relay, Integrated Services Digital Network ("ISDN"), Public Switched Telephone Network ("PSTN"), etc. The workstations 511 may connect directly to the gateway 546 using dial connections 550b or 550c. Further, the wireless network 542 and network 544 may connect to one or more other networks (not shown), in an analogous manner to that depicted in FIG. 5.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While several embodiments of the present invention have been described, additional variations and modifications in those embodiments may occur to those skilled in the art once they learn of the basic inventive concepts. Therefore, it is intended that the appended claims shall be construed to include all such variations and modifications as fall within the spirit and scope of the invention.

The invention claimed is:

1. A computer-implemented policy-based security certificate filtering method, comprising:
    receiving, by a first entity in a communications network during a handshaking protocol exchange for establishing a secure connection with a second entity, a security certificate of the second entity; and
    responsive to determining that a certificate authority certificate in a certificate authority chain of the security certificate is not available at the first entity and the security certificate therefore cannot be authenticated, using policy-based security certificate filtering as a substitute for the authentication, comprising:
        locating at least two policy specifications that are applicable to the security certificate;
        evaluating each of the at least two located policy specifications to determine whether the handshaking protocol exchange continues or fails; and
        continuing the handshaking protocol exchange if the evaluating so indicates, and causing the handshaking protocol exchange to fail otherwise.

2. The method according to claim 1, wherein at least one of the at least two policy specifications indicates that input from a user is required to determine whether the handshaking protocol exchange continues or fails, and further comprising:
    requesting the input from the user; and
    continuing the handshaking protocol exchange or causing the handshaking protocol exchange to fail, according to the user input.

3. The method according to claim 1, wherein the first entity is a client device and the second entity is a server device.

4. The method according to claim 1, wherein the first entity is a server device and the second entity is a client device.

5. The method according to claim 1, wherein the at least two policy specifications are evaluated in order of most-specific conditions to least-specific conditions.

6. The method according to claim 1, wherein the policy specifications comprise policy rules, each policy rule comprising at least one condition to be used in the evaluation and an action to be used upon making the determination.

7. The method according to claim 1, wherein the determination that the handshaking protocol exchange continues is reached upon evaluating at least one of the at least two located policy specifications that specifies conditions under which the security certificate is permitted.

8. The method according to claim 1, wherein the determination that the handshaking protocol exchange fails is reached upon evaluating at least one of the at least two located policy specifications that specifies conditions under which the security certificate is blocked.

9. The method according to claim 1, wherein the evaluating further comprises comparing each of at least one condition specified in the evaluated policy specifications to information pertaining to the security certificate.

10. The method according to claim 1, wherein:
    an identification of an issuer of the security certificate is extracted from the security certificate;
    the locating uses the extracted identification to locate the at least two policy specifications that are applicable to making the determination; and
    at least one of the located policy specifications pertains to authenticating certificate authority certificates in the certificate authority chain of the security certificate.

11. The method according to claim 9, where the information pertaining to the security certificate comprises an identification of an issuer of the security certificate and a validity period of the security certificate.

12. The method according to claim 1, wherein locating at least two policy specifications further comprises locating at least two policy specifications that pertain to at least one value specified in the security certificate.

13. The method according to claim 1, wherein locating at least two policy specifications further comprises locating at least two policy specifications that pertain to the first entity.

14. The method according to claim 1, wherein locating at least two policy specifications further comprises locating at least two policy specifications that pertain to the second entity.

15. A system for policy-based security certificate filtering, comprising:
    a first entity communicably coupled to a second entity in a communications network;
    a policy repository that stores, at least temporarily, at least two policy specifications pertaining to secure communications between the first entity and the second entity;
    a security certificate of the second entity, received by the first entity from the second entity by communications over the communications network during a handshaking protocol exchange for establishing a secure connection between the first and the second entity;
    a computer comprising a processor; and
    instructions which are executable, using the processor, to implement functions comprising:
        locating in the policy repository, responsive to determining that at least one certificate authority certificate in a certificate authority chain of the received security certificate is not locally stored by the first entity and the received security certificate therefore cannot be authenticated, at least two of the stored policy specifications that are applicable to the received security certificate;
        evaluating each of the at least two located policy specifications, as a substitute for the authentication, to determine whether the handshaking protocol exchange continues or fails; and continuing the handshaking protocol exchange if the evaluating so indicates, and causing the handshaking protocol exchange to fail otherwise.

16. A computer program product for policy-based security certificate filtering, the computer program product embodied on one or more non-transitory computer-usable storage media and comprising computer-readable program code that, when executed on a computer, causes the computer to:

determine whether a first entity that receives a security certificate from a second entity during a handshaking protocol exchange will continue the handshaking protocol exchange for establishing a secure connection with the second entity, responsive to detecting that a certificate authority certificate in a certificate authority chain of the security certificate is not available at the first entity and the security certificate therefore cannot be authenticated, comprising:

locating at least two policy specifications that are applicable to the security certificate;

evaluating each of the at least two located policy specifications, as a substitute for the authentication, to determine whether the handshaking protocol exchange continues or fails; and continuing the handshaking protocol exchange if the evaluating so indicates, and causing the handshaking protocol exchange to fail otherwise.

* * * * *